June 17, 1930.  F. A. TRAVIS  1,765,250
SIGN ADJUSTER OR SEAT INDICATING DEVICE
Filed March 13, 1929  6 Sheets-Sheet 5
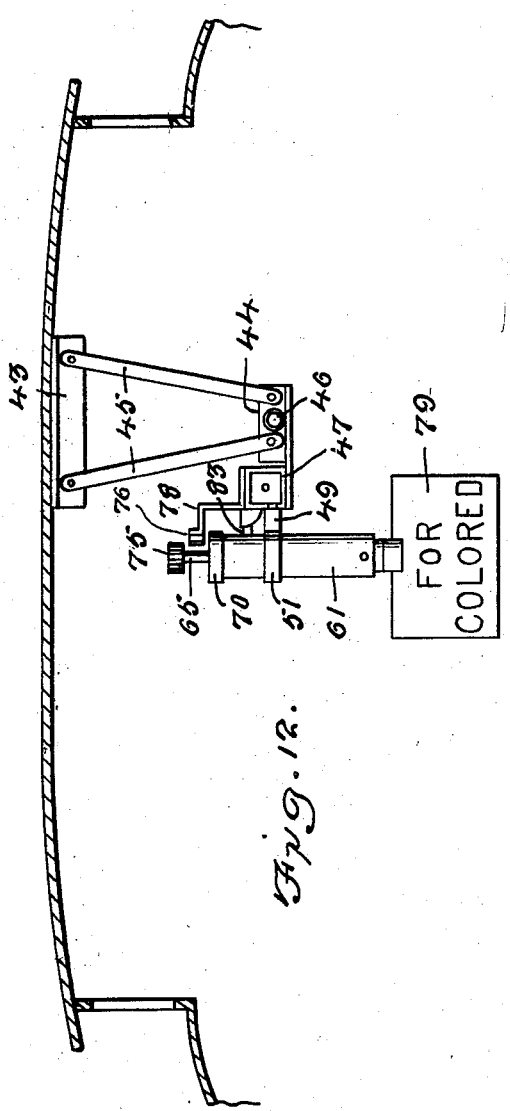
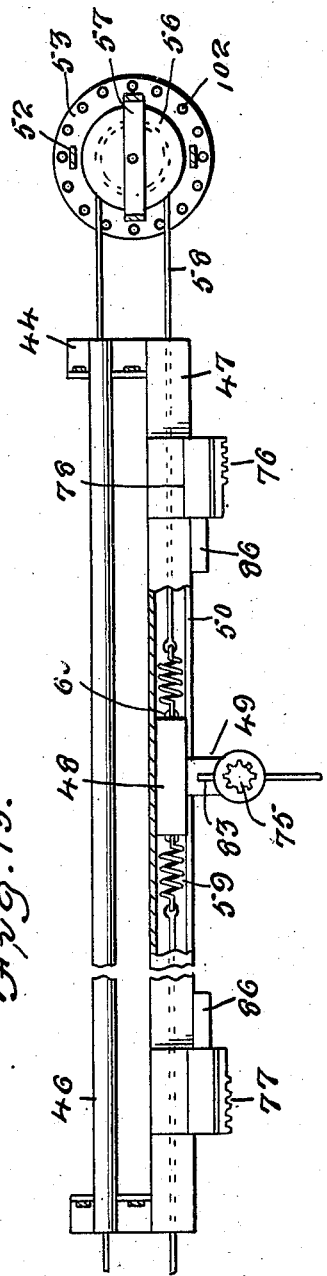
F. A. Travis INVENTOR
BY Victor J. Evans
ATTORNEY June 17, 1930.   F. A. TRAVIS   1,765,250
SIGN ADJUSTER OR SEAT INDICATING DEVICE
Filed March 13, 1929   6 Sheets-Sheet 6
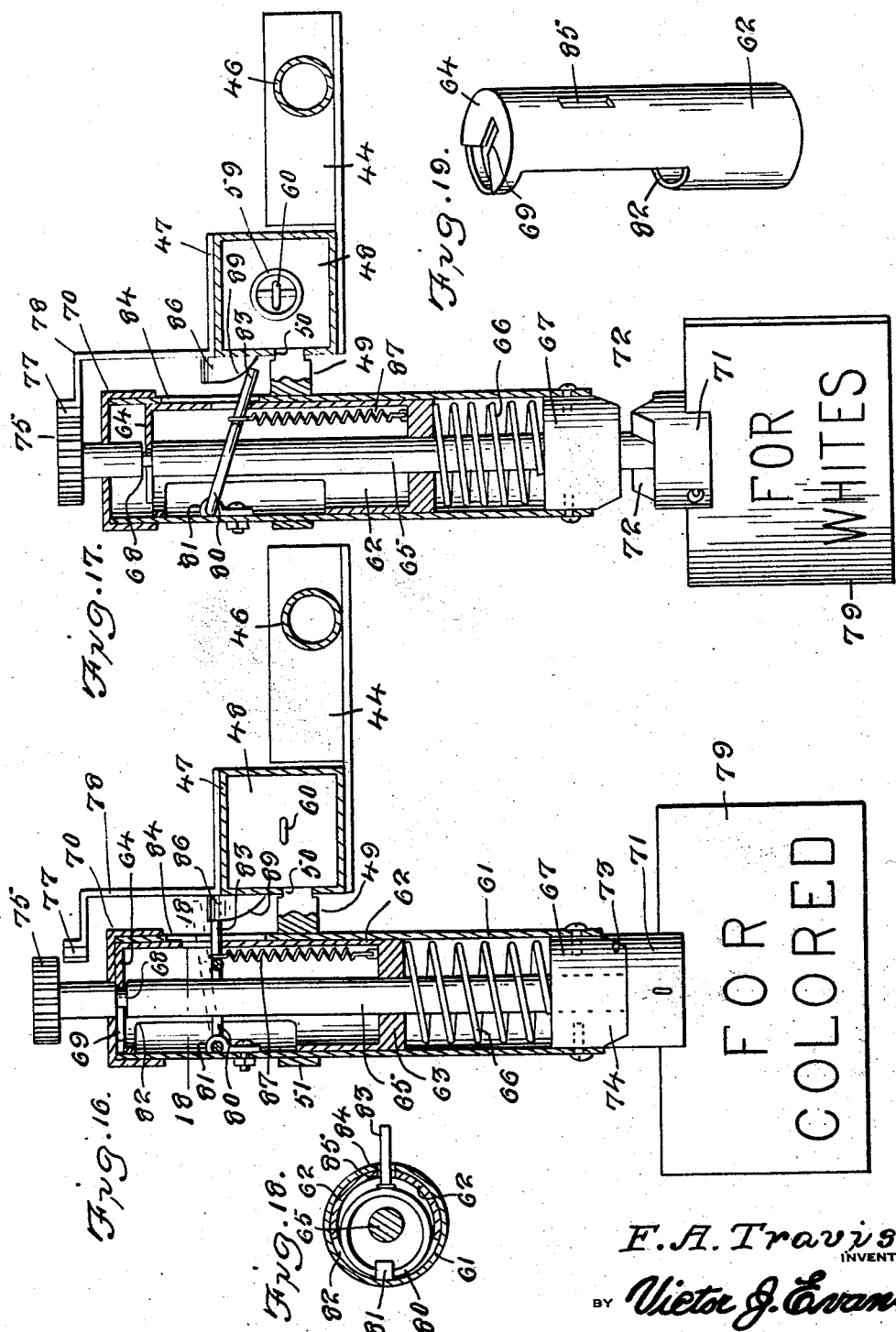

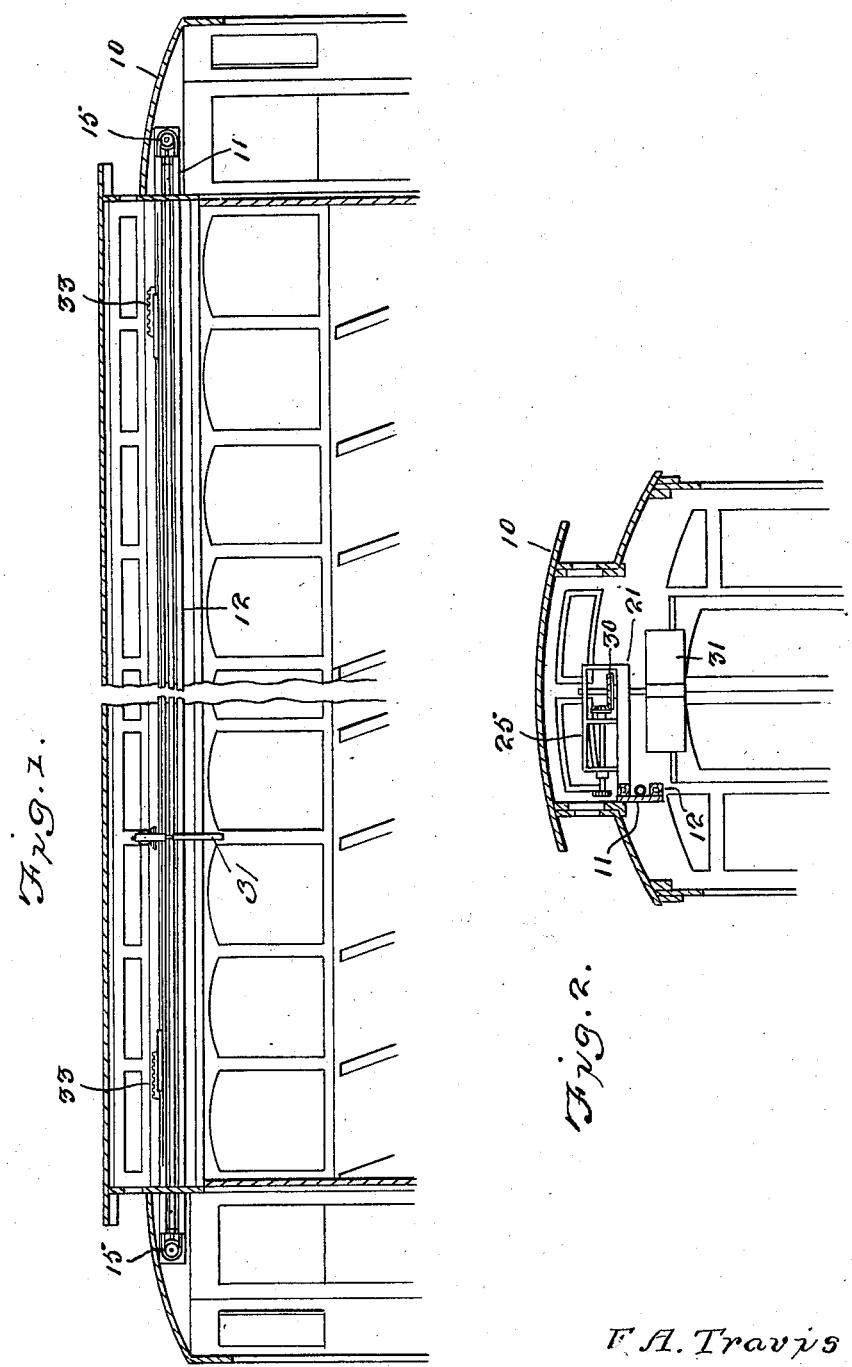

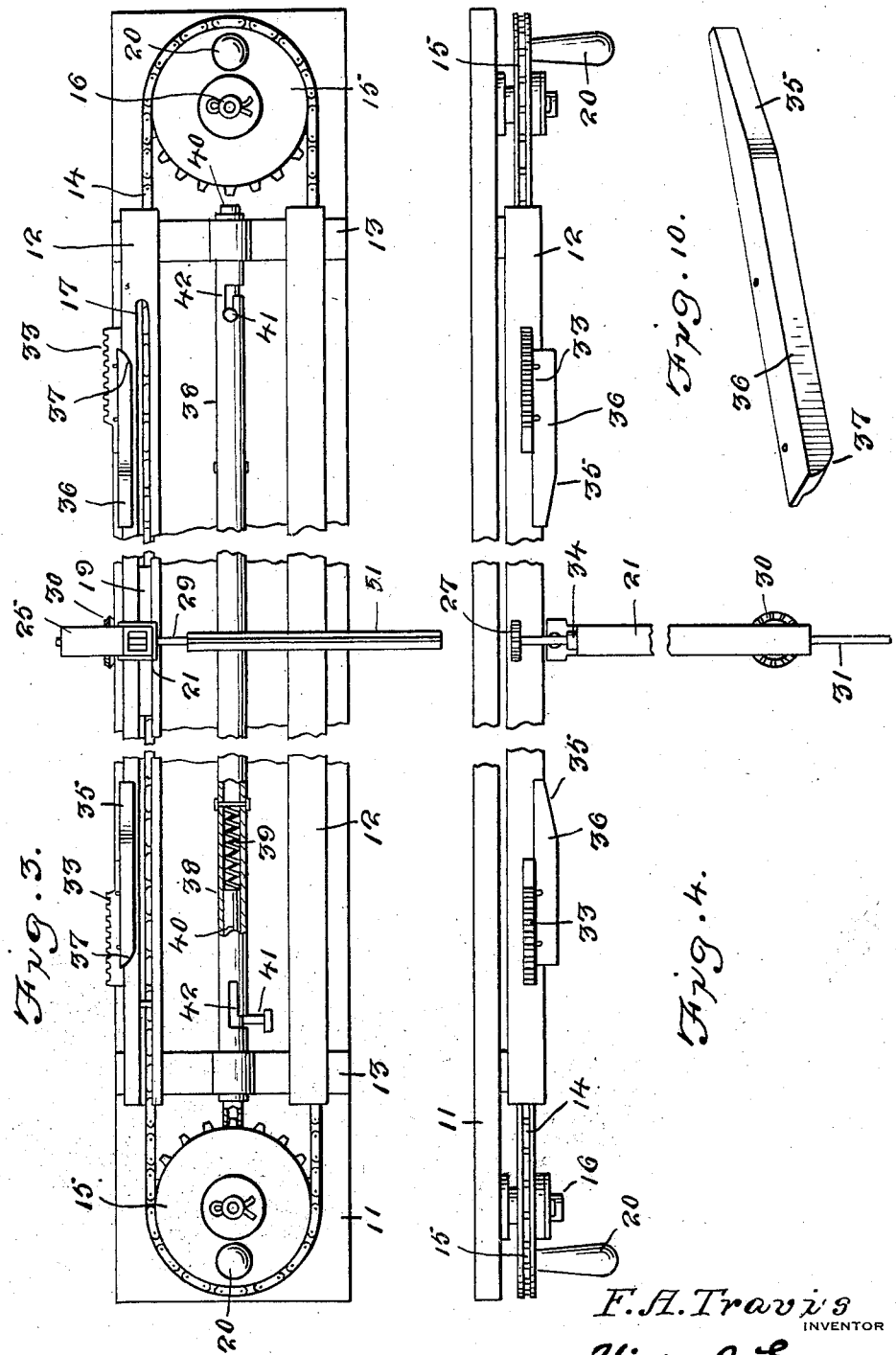

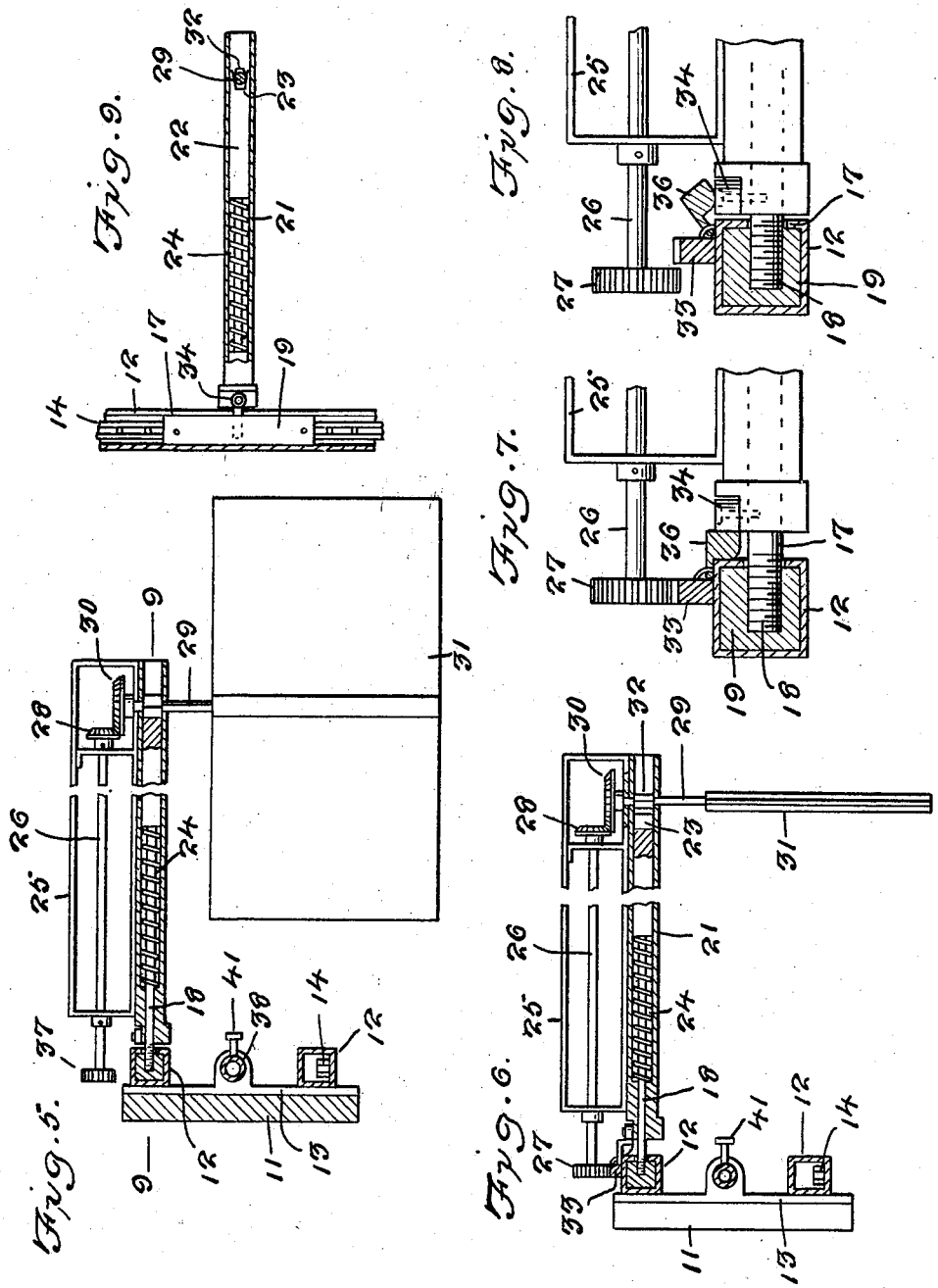

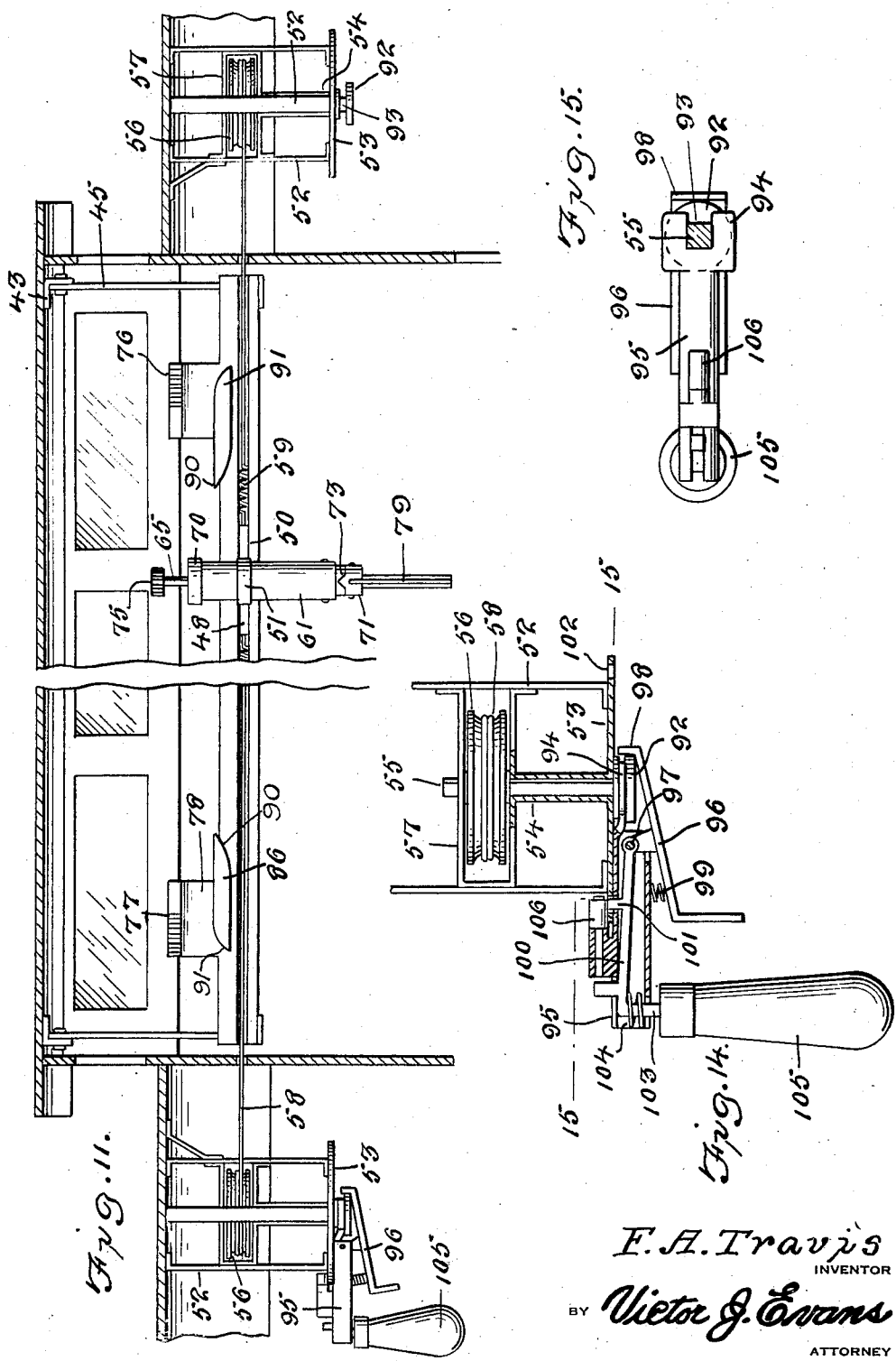

Patented June 17, 1930

1,765,250

UNITED STATES PATENT OFFICE

FRANCIS A. TRAVIS, OF DALLAS, TEXAS

SIGN ADJUSTER OR SEAT-INDICATING DEVICE

Application filed March 13, 1929. Serial No. 346,615.

This invention relates to signal devices primarily adapted for use within buses, street cars, interurbans, trains, and in fact all types of common carriers to indicate the white and colored seats by sections.

An object of the invention contemplates a signal element adapted to indicate the white and colored seats by sections.

Another object of the invention contemplates an operating mechanism adapted to shift the signal element.

An additional object of the invention consists of a reverse mechanism adapted for use in conjunction with the signal element to reverse the position of the signal element rather than turn the carrier completely around.

More specifically stated the operating mechanism is provided with a handle member to retain a signal element in a desired position against unauthorized use.

With the above and other objects in view, the invention further consists of the following novel features and details of construction, to be hereinafter more fully described, illustrated in the accompanying drawings and pointed out in the appended claims.

In the drawings:—

Figure 1 is a longitudinal sectional view taken through a street car or other common carrier illustrating the application of the invention.

Figure 2 is a horizontal sectional view taken through the carrier and operating mechanism and illustrating the arrangement of the signal element therein.

Figure 3 is a top plan view of the invention.

Figure 4 is a side elevation thereof.

Figure 5 is a horizontal sectional view taken through the reverse mechanism.

Figure 6 is a view similar to Figure 5 with the reverse mechanism in use.

Figure 7 is an enlarged detail sectional view taken through the reverse mechanism while in use.

Figure 8 is a view similar to Figure 7 with the reverse mechanism released.

Figure 9 is a sectional view taken on line 9—9 of Figure 5.

Figure 10 is a perspective view of a shift member adapted for use in conjunction with a reverse mechanism.

Figure 11 is a fragmentary longitudinal sectional view taken through a street car illustrating the application of a modified form of my invention.

Figure 12 is a horizontal sectional view taken through the invention, as applied.

Figure 13 is a plan view of the invention per se.

Figure 14 is a detail sectional view taken through the operating mechanism of the modification.

Figure 15 is a sectional view taken on line 15—15 of Figure 14.

Figure 16 is a longitudinal sectional view taken through the signal reversing means.

Figure 17 is a view similar to Figure 16 illustrating the operating position of the reversing means.

Figure 18 is a horizontal sectional view taken on line 18—18 of Figure 16.

Figure 19 is a perspective view of the housing for the reversing means.

Referring to the drawings in detail wherein like characters of reference denote corresponding parts, the reference character 10 indicates a street car or other common carrier.

The invention contemplates a supporting plate 11 adapted to be supported within the street car in the manner as best illustrated in Figures 1 and 2 of the drawings.

Tubular members 12, carried upon plate members 13 supported upon the supporting plate 11, are arranged in spaced parallelism upon the plate members 13, in the manner illustrated in Figure 3 of the drawings.

An endless belt or chain, such as indicated at 14, extended within the bores of the tubular members 12, are adapted for connection at the outermost looped ends thereof with pulley or sprocket wheels 15 journaled, as at 16, upon the supporting plate 11. A pulley or sprocket wheel is arranged at both ends of the supporting plate 11 whereby the endless belt or chain may be actuated from either end of the street car.

One of the tubular members 12 is provided with an elongated slotted portion 17 through which a shaft member 18 is projected from a member 19 slidably mounted within the particular tubular member and having connection at its ends with the adjacent ends of the belt or chain 14. Handle members 20, eccentrically mounted upon the pulley or sprocket wheels 15, are adapted to impart rotation thereof to shift the member 19 within the particular tubular member 12.

The reverse mechanism contemplates a housing 21 adapted to accommodate the outermost end of the shaft 18. A locking element 22, carried upon the outermost end of the shaft 18, is provided with a V-shaped cut-out portion 23 in the extremity thereof, the purpose of which will be presently apparent. A compression spring 24, carried within the housing 21, is adapted to normally retain the shaft 18 in the position shown in Figure 5 of the drawings.

A frame member 25, carried by the housing 21, is provided with a rotatably mounted shaft 26 having a spur gear 27 upon one end and a pinion gear 28 upon the other. A shaft 29, horizontally disposed and journaled within the housing 21 and frame 25, is provided with a beveled gear 30 adjacent one end adapted for meshing engagement with the pinion 28. A placard or other signal element, such as indicated at 31, is mounted upon the opposite end of the shaft 29. Lugs 32, fixed to and laterally disposed upon that portion of the shaft 29 within the housing 21, are adapted for selective registration within the cut-out portion 23 in the locking element 22.

The tubular member, having the slotted portion 17, is provided with rack bar portions 33 upon the upper side thereof adjacent the ends of the slot therein. A roller member 34, carried upon the innermost end of the housing 21, is adapted to ride upon the aforementioned tubular member until the reversing apparatus nears the rack bar portions 33. At such juncture the inclined faces 35 of swingably mounted shift members 36 are engaged and which will cause the compression spring 24 to be compressed and the spur gear 27 accordingly shifted for meshing engagement with the adjacent rack bar portion 33. The rack bar portions and shift members are located adjacent the ends of the cut-out portion 17. Contacting engagement of the spur gear 27 and the rack bar portions 33 will accordingly rotate the shafts 26 and 29 respectively to reverse the position of the placard or signal element 31.

The reversed mechanism may then be shifted within the street car to subdivide the seating compartments and the sections for white and colored passengers. Manifestly the locking mechanism is called into use upon the reversal of the signal or placard to hold and sustain the same in a desired position.

The outermost ends of the shift members 36 are beveled, as at 37, whereby the housing 21, when retracted, will engage the same and elevate the shift member instead of reversing the position of the signal or placard.

A sleeve 38, carried upon the plates 13, is adapted to accommodate compression springs 39 adapted for contacting engagement with the adjacent ends of telescopically associated rod members 40 having pockets or bores within the outermost ends thereof to accommodate the adjacent teeth of the sprocket wheels 15 whereby accidental displacement or unauthorized use of the operating mechanism will be prevented when said rod members 40 are shifted by the pins 41 within the bayonet slots 42 in the sleeve 38.

In the form and modification of my invention illustrated in Figures 11 to 19 inclusive, in sheets 4, 5 and 6 of the drawings, the idea is to dispose or otherwise suspend the sign plate in the center of the car preferably above the aisle and in carrying out this construction, I provide bracket members 43 secured to the inner side of the top of the common carrier and to one side of the longitudinal center thereof.

Supporting plates 44, suspended from arms 45 depending from the brackets 43, support a tubular member 46 and a channel member 47 therebetween. A block 48, shaped in conformity with the bore of the channel member 47, is mounted for oscillatory sliding movement therein. An arm 49, carried by and projecting from the block or slide 48, is projected through an elongated slot 50 in one side of the channel member 47. A ring 51 is formed upon the outermost projecting portion of the arm 49, the purpose of which will be presently apparent. Supporting arms 52, carried by and depending from the under side of the canopies projecting from the ends of the vehicle body, carry horizontally disposed disk members 53 upon the lowermost projecting ends thereof. Sleeves 54, carried by and projecting centrally of the disks 53 and having the bores thereof in communication with central openings therein, are adapted to accommodate axles 55. Said axles are furthermore adapted to carry pulley wheels 56 within the enclosures defined by U-shaped brackets 57 supported between the opposed bracket arms 52 in the manner shown in Figures 11 and 14. A belt, cable, or other connecting element, such as indicated at 58, wound about the pulley wheels 56 and passed through the tubular member 46 and channel member 47, is adapted for connection at its ends with spring elements 59 of the retractile type having connection at their opposite ends with ears 60 upon the opposed ends of the block or slide member 48, substantially as illustrated in Figure 13 of the drawings.

A barrel or housing member 61, preferably of cylindrical formation, carried by the ring 51 of the shank or arm 49 for the slide or block member 48, houses a sleeve member 62 being closed at the ends thereof by walls 63 and 64 respectively.

A shaft 65, extended axially of the longitudinal center of the housing and sleeve therefor, is projected through a central opening in the end wall 63 of the sleeve member 62 as evidenced from the illustration of my invention in Figures 16 and 17 of the drawings. A compression spring 66, encircling the shank 65 and having contacting engagement at the opposed end convolutions thereof with the adjacent sides of the bottom wall 63 for the sleeve member 62 and a stop collar 67 carried within one end of the housing 61, is adapted to normally retain the sleeve 62 in the Figure 16 position. The shaft 65 is in addition provided with a reduced portion 68 adapted for disposition within a slotted portion 69 in the end wall 64 of the sleeve member 62 whereby simultaneous sliding action of the shaft and sleeve within the housing 61 will be facilitated. A closure cap 70, carried upon the opposite end of the housing 61, is centrally apertured to permit projection of the adjacent end of the shaft 65 and which will prevent excess sliding movement of the sleeve 62 therein.

A collar 71, carried upon that end of the shaft 65 passing through the collar 67, is provided with multiple cam faces 72 receivable within pockets or seats 73 in the adjacent side of the collar 67. Fins of the configuration shown, as at 74, and which form the side walls of the seat 73 in the outer portion of the collar 67 retains the cams 72 within their respective seats. The spur gear 75, carried by and horizontally disposed upon the opposite projecting end of the shaft 65, is adapted for selective contacting engagement with rack bar portions 76 and 77 carried by bracket members 78 and disposed in the path of movement thereof but as evidenced from the illustration in Figure 16 of the drawings, the shaft 65 must be lowered in order to effect such engagement to alter the position of the placard 79 from the position shown. The action taking place in the lower and turning movement of the shaft 65 in the reversal of the placard 79 is manifest from an inspection in Figure 17.

A trigger, comprising a ring 80 pivotally mounted for swinging movement within a bearing member 81 included upon the inner side wall of the housing 61 and extended within the adjacent portion of the sleeve 62 through a slotted portion 82 therein, is so disposed as to permit passage of the shaft 65 therethrough.

An arm 83, carried by and extended from that portion of the ring 80 in oppositely disposed relation with respect to the bearing 81 and through registering slots 84 and 85 respectively in the housing and sleeve, is adapted for selective contacting engagement with the ends and opposite sides of shift members 86 carried upon the adjacent wall of the channel member 47.

A retractile spring 87 has connection terminally thereof with the arm 83 and the upper side of the end wall 63 of the sleeve 62 whereby said arm will be normally induced to occupy the Figure 17 position. The shift members 86 have sloping outer sides 89, flat upper side edges and long and short obliquely disposed ends 90 and 91 respectively the purpose of which will be presently apparent.

Hubs 92, carried upon the lowermost projecting ends of the axles 55, also provide attaching portions 93 for the forked ends 94 of a sleeve member 95. A locking lever 96, pivotally mounted, as at 97, upon the sleeve 95, terminates to provide an offset extremity 98 projecting over one side of the adjacent hub 92 to retain the forked extremity 94 upon the attaching portions 93 therefor. A spring element 99 interposed between the adjacent sides of the locking lever 96 and sleeve member 95 normally retains said lever in the Figure 14 position.

A shank 100, mounted upon the pivot 97 for rocking movement within the bore of the sleeve 95, carries a rightangularly disposed stud 101 projected through an opening in the side wall of the sleeve for selective reception within any one of a plurality of a circumferential line of openings 102 in the disks 53.

An offset portion 103, formed upon the opposite end of the shank 100 and extended through a slot 104 adjacent the outermost end of the sleeve 95, carries a handle member 105 exteriorly thereof. A roller member 106, carried upon the outer side of the sleeve member 95 in spaced relation thereto, is adapted to engage the opposite sides of the disks 53 diametrically opposed to that of the stud 101.

After the handle construction, as shown in Figure 14 of the drawings, has been applied in the manner mentioned in the foregoing, downward pull and rotary action exercised upon the handle member 105 of the shank 100 will disengage the stud 101 therefor from the particular opening in the circumferential line of openings 102 in the adjacent disk 53. Successive revolutions of the handle and the engaged axle 54 will cause the cable, belt, linkage or other connector 58, to move through the tubular member 46 and channel member 47. The block or slide 48, incident to its specific connection with the connector 58 as shown in Figure 13 of the drawings, will shift or slide within the channel member 47 toward either end thereof.

When the block or slide 48 is shifted through the channel member 47 an appreciable distance and when approaching the adjacent shift member 86 from the longer obliquely disposed end 90 thereof, the arm 83 will engage same and slide against the sloping outer surface 89 therefor whereby the sleeve 62 will be shifted downwardly within the housing 61 to occupy the Figure 17 position incident to the connection of the arm 83 with the bottom wall of the slot 85 therein. The lowering action of the sleeve 62 is simultaneous with that of the shaft 65 whereby the spur gear 75 upon the uppermost end thereof will be engaged with the adjacent rack bar portion 77. Further shifting movement of the lock or slide 48 will cause the shaft 65 to rotate a half turn whereby the placard 79 will be reversed. The cams 72 of the collar 71 will ride upon the fins 74 of the collar 67 and again drop within the seats 73 of the collar 67 whereby the placard 79 will be disposed horizontally and above the aisle in the vehicle. Movement of the block or slide 48 in an opposite direction through the channel member 47 will cause the arm 83 to engage the shorter obliquely disposed end 91 of the adjacent shift member 86 and ride upwardly thereon and against the upper side edge thereof. The gear 75 will then occupy the Figure 16 position free of contacting engagement with the adjacent rack bar portion located in the path of movement thereof. The sign will remain in the same position during transit until the arm 83 engages the longer obliquely disposed end of the opposed shift member 86.

It is to be noted that common carriers equipped with either of my forms of invention will obviate the usual necessity of reversing the position of the carrier, inasmuch as the signal element may be more easily reversed.

The invention is susceptible of various changes in its form, proportions and minor details of construction, and the right is herein reserved to make such changes as properly fall within the scope of the appended claims.

Having thus described the invention, what is claimed is:—

1. A signal comprising a supporting apparatus, conduits carried thereby, rotatable elements carried adjacent the ends of the apparatus, an endless connector trained over the rotatable elements and extended within the conduits, a carriage slidably mounted within the conduits having connection with the endless connector, a reverse mechanism carried by the carriage, a signal element operable in conjunction with the reverse mechanism, a gear member carried by the reverse mechanism, rack bar portions in line with the gear, shift members located in the path of movement of the carriage to shift the latter to effect meshing engagement of the gear and rack bar portions and reversing of the signal element.

2. A signal comprising a supporting apparatus, conduits carried thereby, rotatable elements arranged adjacent the ends of the conduits upon the supporting apparatus, an endless connector trained over the rotatable elements and extended within the conduits for longitudinal shifting movement therein, a carriage slidably mounted within one of the conduits having connection with the connector for simultaneous reciprocatory movement therein, rack bar portions arranged at intervals upon the aforementioned conduit, a signal element carried by the carriage, a gear member connected for simultaneous motion with the signal element, and shift members arranged upon the conduit to dispose the gear member in line with the rack bar portions and to reverse the position of the signal element upon the occasion of the traveling meshing engagement thereof.

In testimony whereof I affix my signature.

FRANCIS A. TRAVIS.